United States Patent Office 3,121,664
Patented Feb. 18, 1964

3,121,664
STABLE, HERMETICALLY SEALED ISOTONIC PARENTERAL VEHICLES CONTAINING BUFFERED WARFARIN SODIUM
Clarence F. Hiskey, Great Neck, and Nathan Weiner, Rego Park, N.Y., assignors to Endo Laboratories Inc., Richmond Hill, N.Y., a corporation of New York
No Drawing. Filed Apr. 10, 1961, Ser. No. 101,689
8 Claims. (Cl. 167—65)

This invention relates to warfarin. More particularly, it is directed to stable solutions of warfarin sodium; and the preparation thereof.

The principal objects of this invention, accordingly, are to provide stable solutions of warfarin sodium particularly suitable for injection; and the preparation thereof.

The hypoprothrombinemic property of warfarin, 3-α-acetonyl-benzyl-4-hydroxycomarin, is well-known from the sudies of Karl Link. Warfarin has achieved widespread medical use for the purpose of controlling thrombotic episodes in the treatment of coronary thrombosis, myocardial infarction and analogous diseases characterized by formation of blood-clots in large blood-vessels.

The introduction of warfarin as a therapeutic agent has, in many instances, been life-saving. The preferred route of its administration has been via oral tablets. This route of administration provides the simplest means of inducing hypoprothrombinemia. Since patients suffering from those diseases in which it is desirable to produce hypoprothrombinemia are frequently incapable of taking oral medication, either due to gastric intolerance of the drug or to being in a comatose condition as a consequence of the disease, it is frequently necessary to administer the drug by the parenteral route. For this purpose the drug, which is usually administered in the form of its sodium salt (warfarin sodium, U.S.P.), can be administered in sterile aqueous solution by the parenteral route.

Unfortunately, aqueous solutions of sodium warfarin are unstable for any lengthy period of time.

Currently available injectable forms of warfarin sodium usually consist of sterile warfarin sodium powder admixed with sodium chloride, achieved by dehydration from the frozen state, ready for redissolution in sterile distilled water. The solution of sodium warfarin prepared from this material, using sterile distilled water, will remain clear for from 2 to 24 hours. At some time during this period such a solution will start to deposit the free enolic compound (3-α-acetonyl-benzyl-4-hydroxycoumarin).

We found that this arises as a consequence of the absorption of carbon dioxide from the air. This can be prevented for varying longer periods of time by increasing the alkalinity of the sodium warfarin with addition of small quantities of sodium hydroxide or sodium carbonate in the course of the preparation of the sterile dried sodium warfarin. However, when this is done there is produced a product which no longer corresponds to the standards of the U.S. Pharmacopoeia for warfarin sodium for injection, in that the material is altered so that the value, "color in alkaline solution," exceeds the standard limit of 0.1 given in that compendium.

It is frequently desirable to have a solution which will be stable for longer than the above-mentioned periods of time, and of the proper standards of purity, since the use of warfarin sodium in the comatose patient may be prolonged.

In the usual conditions of use, warfarin sodium is administered in an initial dose of 40 to 60 mgs., in order to produce a rapid hypoprothrombinemia. After the desired level of hypoprothrombinemia is reached, this is then maintained by administration of small quantities of warfarin sodium: 5 to 10 mgs.

It is not practical to prepare solutions containing such small quantities for each particular patient, since the maintenance dose of warfarin sodium must be carefully titrated to the patient's hypoprothrombinemic response. It is thus obvious that it is extremely desirable that there be available a stable aqueous solution of warfarin sodium, i.e., one which will not exceed the standard for alkaline color value nor precipitate free warfarin on standing for some relatively prolonged period: e.g., 30 days.

Having discovered the reason for the increase in alkaline color value as a consequence of excess alkali and the cause of the precipitation as being due to the interaction of sodium warfarin with an acidifying atmosphere, we investigated the precise conditions under which we might expect warfarin sodium to be stable in solution and unaltered in alkaline color value.

The conditions for achieving solutions of warfarin sodium with the above properties are not readily apparent. Warfarin has the structure:

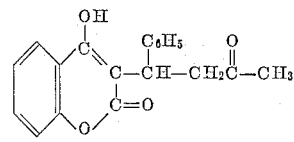

The acidity of this compound, as has been pointed out by Link, is due to the enolic structure associated with the 4-hydroxycoumarin function. Enols are only weakly acidic, and generally have been found to be much less acidic than carboxylic acids. However, in order to determine the proper conditions for achieving a stable solution of warfarin sodium, we decided to determine the $pK_a$ of warfarin, or, conversely, the $pK_b$ of sodium warfarin. This was done by a spectrophotometric procedure, in which the change in spectrum of the enolic form, as stabilized by the presence of acid, was plotted against the pH of the solution. From the data thus obtained, spectrophotometrically, the $pK_a$ could be calculated.

Surprisingly, we found that the $pK_a$ of warfarin was $5.05 \pm 0.1$, or that the acid dissociation constant is $1 \times 10^{-5}$. This is an unexpected and surprising value.

As stated above, enols are generally considerably weaker than carboxylic acids by one or two orders of magnitude in their acidity dissociation constant.

We discovered that the dissociation constant of warfarin is nearly the same as that of the usual organic carboxylic acid; thus the acid dissociation constant of acetic acid is $1.8 \times 10^{-5}$, and of propionic acid is $1.4 \times 10^{-5}$. It can readily be seen that warfarin is an acid with a dissociation constant of the same order of magnitude as the usual carboxylic acids. Thus, we unexpectedly found that it is possible to buffer solutions of sodium warfarin with buffer systems that will maintain the solution at the point of the $pK_b$ of sodium warfarin, so as to eliminate the effect of carbon dioxide absorption and the consequent precipitation. Likewise, the buffer is capable of preventing the alkalinity of the solution from exceeding some predetermined value, e.g. pH 8 to 8.5, and thus minimize the effect of alkali in increasing the "alkaline color value" of sodium warfarin in the presence of excess alkali.

Such buffer systems may be those which are customarily used for the maintenance of such pH values, e.g., disodium phosphate; sodium bicarbonate; sodium maleate; ammonium chloride-ammonia; ethylene diamine mono hydrochloride and ethanolamine-ethanolamine hydrochloride. These are to be considered as representative examples and our invention is not limited to the use of the specific buffers mentioned.

It will be recognized by those familiar with the art that a large variety of partially neutralized acids and bases, in proper proportion, can be used for maintaining a buffer pH at any value and particularly at the value herein specified.

The examples which follow illustrate several of the methods by which our invention may be practiced, but are not intended to limit the means for accomplishing the objects of this invention.

A solution of sodium warfarin containing 25 mg. of warfarin per ml. was prepared. The solution was sterilized by filtration through a Selas candle of such porosity as to remove microbiological contaminants. Any other type of sterile filtration process can likewise serve adequately for this purpose. Aliquots of this solution were then delivered by sterile technique to vials intended for the preparation of pharmaceutical injections, and the thus filled vials were placed in a chamber at 0° F. When the contents of the vials were solidly frozen, they were placed in a chamber which was evacuated to a pressure of below 0.1 mm., while maintaining the solid frozen state of the vial contents. The ice was then permitted to sublime from the vials to a condenser maintained at a temperature below that of the vials until all of the original water had been removed. This left a residue of dehydrated sodium warfarin in the same form, shape and size as the original, frozen-solid solution. These vials were then sealed by a sterile technique with rubber diaphragm caps, held in place by aluminum or plastic seals. These vials of dried sodium warfarin serve as the source of sodium warfarin in the examples hereafter described.

The following examples describe the preparation of a variety of buffers. In each example the buffer, after preparation, was delivered to a container in appropriate volume, and hermetically sealed. The sealed containers and contents were sterilized by heating in an autoclave at 15 lbs. steam pressure for 30 minutes. However, any other method of sterilization will be adequate for this purpose.

*Example 1*

A buffer solution was prepared by dissolving one gram of $Na_2HPO_4$ and 0.45 gram of sodium chloride in 100 ml. of water. One cc. of the thus prepared solution was added to the vial for each 25 mg. of sodium warfarin in it, thus producing a solution containing 25 mg. of sodium warfarin, isotonic with body fluids, and buffered at a pH of 8 to 8.5. Such a solution was maintained for 30 days without any appearance of precipitate or discoloration. The sodium warfarin content during this period of time, analyzed at 3 day intervals, was unchanged from the initial assay.

*Example 2*

A buffer solution was prepared by dissolving one gram of sodium bicarbonate and 0.25 gm. of sodium chloride in 100 ml. of water. This solution was used in place of the di-sodium phosphate buffer of Example 1 in the same way for the preparation of a solution of sodium warfarin. The resulting solution had the same characteristics, property and stability as the solution produced in Example 1.

*Example 3*

A buffer solution was prepared by dissolving one gram of di-sodium maleate ($Na_2C_4H_2O_4$) and 0.44 gm. of sodium chloride in 100 ml. of water. This solution was substituted for the di-sodium phosphate buffer of Example 1, in the preparation of the solution of sodium warfarin. The result achieved in Example 1 was duplicated by this preparation.

*Example 4*

0.40 gm. of ammonium chloride and 0.13 gm. of ammonia ($NH_3$) were dissolved in 100 ml. of water. This solution was substituted for the di-sodium phosphate buffer of Example 1 for the preparation of the solution of sodium warfarin. The analysis, color, and stability of this solution was identical with that prepared in Example 1.

*Example 5*

The buffer solution of Example 1 was replaced by a buffer solution prepared from 1 gram of ethylene diamine mono hydrochloride ($NH_2CH_2CH_2NH_2 \cdot HCl$) per 100 mls. of solution, to yield the same result as that achieved by Example 1.

*Example 6*

The buffer solution of Example 1 was replaced by a buffer solution made up by dissolving 1.4 gms. of ethanol amino hydrochloride and 0.1 gm. of ethanol amine in 100 ml. of water. The solution of sodium warfarin produced by the use of this as the solvent had the same properties and analysis at the beginning and after at least 30 days of storage as the solution produced in Example 1.

It will be understood that the foregoing description of the invention and the examples set forth are merely illustrative of the principles thereof. Accordingly, the appended claims are to be construed as defining the invention within the spirit and scope thereof.

We claim:

1. A stable, hermetically sealed isotonic parenteral vehicle containing warfarin sodium in a buffer solution, wherein the buffer is a member selected from the group consisting of:
   (A) disodium hydrogen phosphate,
   (B) sodium bicarbonate,
   (C) disodium maleate,
   (D) ammonium chloride and ammonia,
   (E) ethylene diamine monohydrochloride,
   (F) ethanolamine hydrochloride and ethanolamine,
   and sodium chloride at a pH of 8.0 to 8.5.

2. A stable, hermetically sealed isotonic parenteral vehicle in accordance with claim 1 wherein the buffer is (A) as defined in claim 1.

3. A stable, hermetically sealed isotonic parenteral vehicle in accordance with claim 1 wherein the buffer is (B) as defined in claim 1.

4. A stable, hermetically sealed isotonic parenteral vehicle in accordance with claim 1 wherein the buffer is (C) as defined in claim 1.

5. A stable, hermetically sealed isotonic perenteral vehicle in accordance with claim 1 wherein the buffer is (D) as defined in claim 1.

6. A stable, hermetically sealed isotonic parenteral vehicle in accordance with claim 1 wherein the buffer is (E) as defined in claim 1.

7. A stable, hermetically sealed isotonic parenteral vehicle in accordance with claim 1 wherein the buffer is (F) as defined in claim 1.

8. Method of preparing a stable, hermetically sealed isontoic parenteral vehicle containing warfarin sodium which consists in adding to sterile lyophylized warfarin sodium, an isotonic solution of sodium chloride and a buffer, wherein the buffer is a member selected from the group consisting of:
   (A) disodium hydrogen phosphate,
   (B) sodium bicarbonate,
   (C) disodium maleate,
   (D) ammonium chloride and ammonia,
   (E) ethylene diamine monohydrochloride,
   (F) ethanolamine hydrochloride and ethanolamine,
   thereby to provide a pH of 8.0 to 8.5.

References Cited in the file of this patent

UNITED STATES PATENTS

| | | |
|---|---|---|
| 2,601,204 | Campbell et al. | June 17, 1952 |
| 2,783,177 | Link | Feb. 26, 1957 |
| 2,999,049 | Link | Sept. 5, 1961 |